(12) United States Patent
Kobayashi (10) Patent No.: US 9,086,971 B2
(45) Date of Patent: Jul. 21, 2015

(54) SEMICONDUCTOR DEVICE, CONFIDENTIAL DATA CONTROL SYSTEM, CONFIDENTIAL DATA CONTROL METHOD

(71) Applicant: LAPIS SEMICONDUCTOR CO., LTD., Yokohama (JP)

(72) Inventor: Koji Kobayashi, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 134 days.

(21) Appl. No.: 13/862,283

(22) Filed: Apr. 12, 2013

(65) Prior Publication Data

US 2013/0275831 A1 Oct. 17, 2013

(30) Foreign Application Priority Data

Apr. 13, 2012 (JP) .................................. 2012-092376

(51) Int. Cl.
| | |
|---|---|
| *G11C 29/00* | (2006.01) |
| *G06F 11/08* | (2006.01) |
| *G06F 12/14* | (2006.01) |
| *G06F 21/79* | (2013.01) |

(52) U.S. Cl.
CPC ............ *G06F 11/08* (2013.01); *G06F 12/1408* (2013.01); *G06F 21/79* (2013.01); *G06F 2221/2107* (2013.01)

(58) Field of Classification Search
CPC .................................. G06F 11/1076

USPC ................................... 714/764, 758
See application file for complete search history.

(56) References Cited

U.S. PATENT DOCUMENTS

| | | | | | |
|---|---|---|---|---|---|
| 4,326,267 | A | * | 4/1982 | Lazzari ............................. | 365/1 |
| 4,614,861 | A | * | 9/1986 | Pavlov et al. ................. | 235/380 |
| 5,726,770 | A | * | 3/1998 | Harada ......................... | 358/444 |
| 6,182,217 | B1 | * | 1/2001 | Sedlak .......................... | 713/172 |
| 2010/0077280 | A1 | * | 3/2010 | Ootsuka ....................... | 714/758 |

FOREIGN PATENT DOCUMENTS

| | | |
|---|---|---|
| JP | 2009-83211 A | 4/2009 |
| JP | 2011-60136 A | 3/2011 |

* cited by examiner

*Primary Examiner* — Fritz Alphonse
(74) *Attorney, Agent, or Firm* — Studebaker & Brackett PC (57) ABSTRACT

A semiconductor device, a confidential data control system and a confidential data control method are provided capable of safeguarding confidential data even in cases of unauthorized access. Control is performed to alternately store confidential data segments of divided confidential data and respective corresponding segment parity data in a memory. When reading the confidential data, errors in the confidential data segment are checked for with the segment parity data, corrected when an error has occurred, and read. The confidential data is not stored altogether in the memory, and so the confidential data is rendered difficult to discern even in cases in which unauthorized access (hacking) has occurred to the confidential data control system.

12 Claims, 7 Drawing Sheets

SEMICONDUCTOR DEVICE, CONFIDENTIAL DATA CONTROL SYSTEM, CONFIDENTIAL DATA CONTROL METHOD

CROSS-REFERENCE TO RELATED APPLICATION

This application is based on and claims priority under 35 USC 119 from Japanese Patent Application No. 2012-092376 filed on Apr. 13, 2012, the disclosure of which is incorporated by reference herein.

BACKGROUND

1. Technical Field

The present invention relates to a semiconductor device, a confidential data control system, and a confidential data control method.

2. Related Art

Generally, security enhanced semiconductor devices and data control methods are known that control encryption keys and confidential data such as personal data so as to suppress data leakage. For example, technology disclosed in Japanese Patent Application Laid-Open (JP-A) No. 2011-60136 (Patent Document 1) stores by dividing up data overall and changing locations such as the address in a single memory. Moreover, for example JP-A No. 2009-83211 (Patent Document 2) discloses technology that divides and controls encryption keys in an image forming apparatus that prints encrypted print data.

In the technology of Patent Document 1, application is difficult in situations in which confidential data is held in a particular region, with a concern that confidential data would be easily found if unauthorized access (hacking) occurs.

Moreover, when division and control are performed separately on an apparatus by apparatus basis as in the technology of Patent Document 2, when one considers cases of application to a system LSI, there is a concern that application would be difficult in cases in which complete application to an IC package is desired, due to configuration becoming complicated.

In related technology for storing (recording) confidential data altogether in a storage unit, such as a nonvolatile storage medium, there is the issue that confidential data becomes more easily read, with an increase in the danger of unauthorized access. Note that "altogether" means that data is simply stored in a row, linearly with respect to address.

SUMMARY

The present invention is proposed to address the above issues, and an object thereof is to provide a semiconductor device, a confidential data control system and a confidential data control method capable of safeguarding confidential data even in cases of unauthorized access.

In order to achieve the above object, a semiconductor device of the present invention includes: a correction unit that corrects an error in plural confidential data segments based on plural segment correction data, wherein a single item of confidential data is divided into a plural confidential data segments and wherein a plural segment correction data for correcting errors in the plural confidential data segments and the plural confidential data segments are alternately stored on a storage unit; and a synthesis unit that synthesizes the plural confidential data segments output from the correction unit.

A confidential data control system of the present invention includes: the semiconductor device; and a storage unit provided externally to the semiconductor device and storing alternately a single item of confidential data that has been divided into plural confidential data segments and plural segment correction data for correcting errors in the plural confidential data segments.

A confidential data control method of the present invention is employed when reading confidential data stored in a state divided into plural confidential data segments from a storage unit alternately stored with a single item of confidential data that has been divided into plural confidential data segments and plural segment correction data for correcting errors in the plural confidential data segments. The control method includes: reading corrected confidential data segments that have been checked for the presence or absence of errors in the confidential data segments based on the segment correction data and have been corrected when an error has occurred; and synthesizing the confidential data from the plural confidential data segments.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a confidential data control system and a semiconductor device for controlling confidential data of the present exemplary embodiment, with reference to the drawings.

Figure 1:
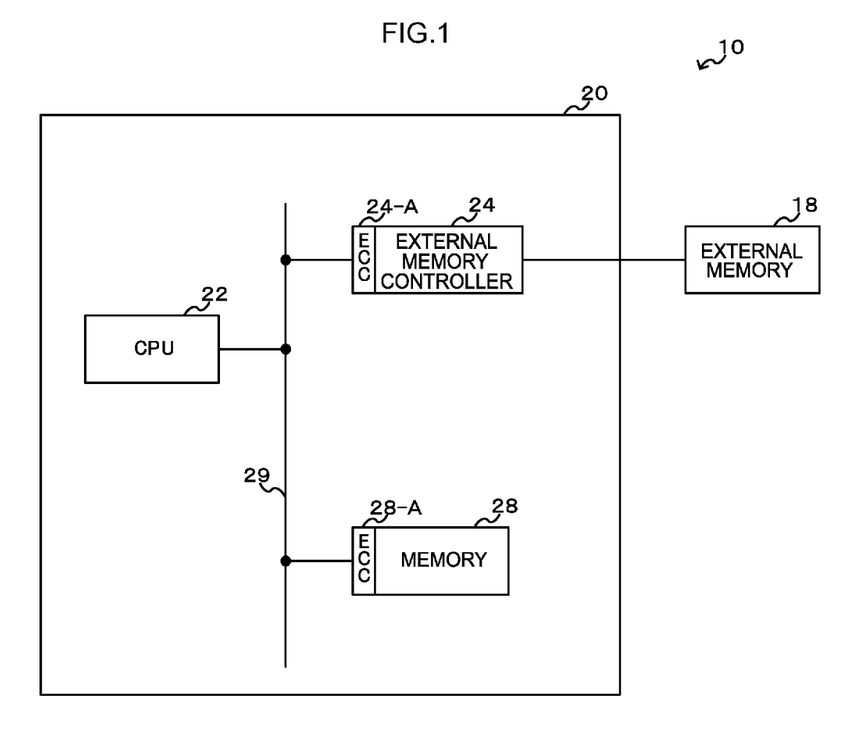
FIG. 1 is a circuit diagram illustrating an example of a schematic configuration of a confidential data control system and a semiconductor device for controlling confidential data in a first exemplary embodiment.

Explanation first follows regarding the configuration of a confidential data control system and a semiconductor device for controlling confidential data in the present exemplary embodiment. An example is illustrated in FIG. 1 of a schematic configuration of a confidential data control system and a semiconductor device for controlling confidential data of the present exemplary embodiment. A confidential data control system 10 of the present exemplary embodiment illustrated in FIG. 1 is configured including an external memory 18, and a semiconductor device 20 for controlling confidential data stored on the external memory 18 and a memory 28.

The external memory 18 is a nonvolatile storage medium, such as for example flash memory.

The semiconductor device 20 includes a CPU 22, an external memory controller 24 and the memory 28. The CPU 22, the external memory controller 24 and the memory 28 are connected together by a bus 29 so as to be able to transmit and receive signals (data) between each other.

The CPU 22 has a function for controlling the operation of the semiconductor device 20 overall. In the present exemplary embodiment, the confidential data stored for example on the external memory 18 and the memory 28 is controlled, and reading of confidential data is performed, by the CPU 22 executing software (a program) stored in for example ROM (not shown in the drawings).

The external memory controller 24 of the present exemplary embodiment has a function to control the external memory 18 when the CPU 22 is writing (storing) data on the external memory 18 or reading data from the external memory 18. The external memory controller 24 of the present exemplary embodiment includes an Error Check and Correct (ECC) 24-A function. The ECC 24-A is a function that when reading confidential data from the external memory 18, checks, based on parity data, to see whether or not there is an error or damage to the confidential data stored on the external memory 18, and performs correction when an error (damage) has occurred.

The memory (internal memory) 28 of the present exemplary embodiment is a nonvolatile storage medium, such as re-writable flash memory, a single-write enabled ROM, or a mask ROM that completes writing during its manufacture. In the present exemplary embodiment, the memory (internal memory) 28 includes an ECC 28-A function, and is what is referred to as an ECC memory. The ECC 28-A is a function that when reading confidential data from the memory 28, checks, based on parity data, to see whether or not there is an error or damage to the confidential data stored on the memory 28 and performs correction when an error (damage) has occurred.

In the present exemplary embodiment, explanation is given of a case in which confidential data stored on the external memory 18 and the memory 28 is controlled, however confidential data 30 may be stored on only one of the external memory 18 or the memory 28. The confidential data control system 10 may also be configured including only the external memory 18 and the external memory controller 24, or including only the memory 28. Note that the external memory 18 and the memory 28 are collectively referred to below simply as "memory".

Explanation follows regarding confidential data stored in at least one of the external memory 18 or the memory 28, and parity data for checking and correcting the confidential data with the ECC 24-A and the ECC 28-A.

Figure 2:
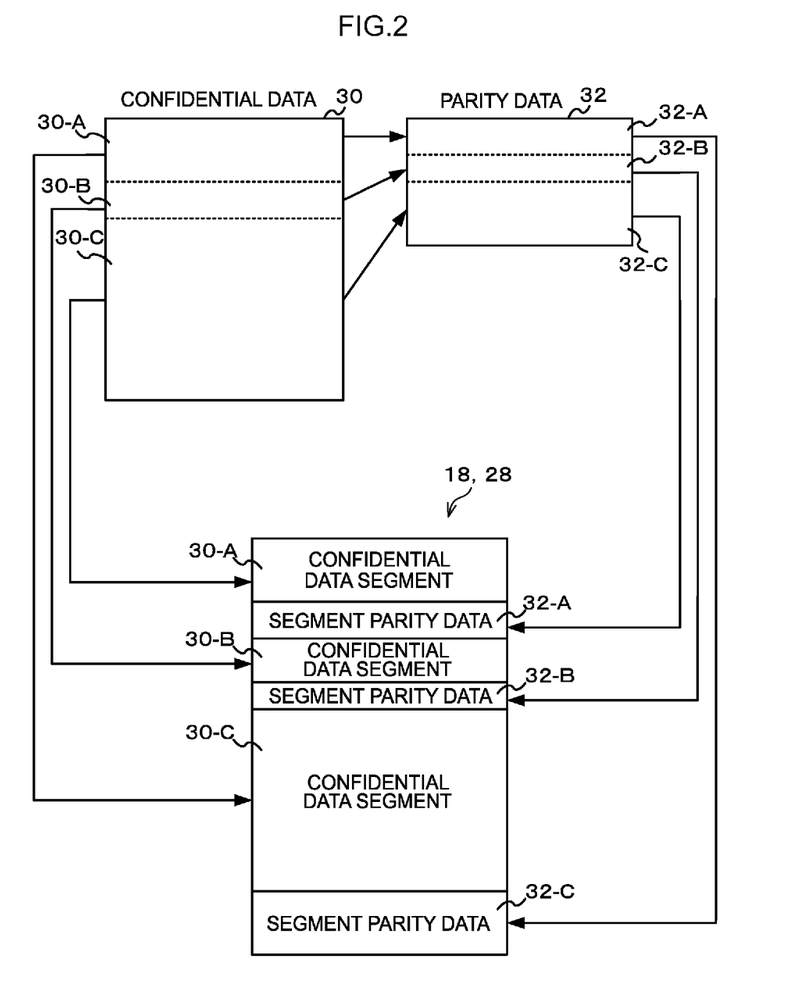
FIG. 2 is a schematic diagram for explaining confidential data and parity data stored in a memory and/or an external memory in the first exemplary embodiment.

FIG. 2 is a schematic diagram of confidential data and parity data of the present exemplary embodiment. Note that in the present exemplary embodiment "confidential data" refers to encryption key data employed for decoding encrypted data, and data that must not be leaked to a third party without access rights, such a personal data.

In the present exemplary embodiment a single (single data item) of the confidential data 30 is divided according to a specific unit (capacity) into plural confidential data segments 30-A to 30-C. Note that the example illustrated in FIG. 2 is a case in which division is made into three. As illustrated in FIG. 2, each of the confidential data segments 30-A to 30-C has a given unit (capacity). Note that in the present exemplary embodiment, the confidential data 30 is divided to give each of the confidential data segments 30-A to 30-C of a different units of data, however there is no limitation thereto and division may be made so as to achieve the same units of data.

In the present exemplary embodiment, as illustrated in FIG. 2, a segment parity data 32-A corresponds to the confidential data segment 30-A, a segment parity data 32-B corresponds to the confidential data segment 30-B, and a segment parity data 32-C corresponds to the confidential data segment 30-C. Note that in the following the segment parity data (32-A to 32-C) are sometimes simply called "parity data 32", collectively referring to the segment parity data (32-A to 32-C) for the confidential data 30.

In the present exemplary embodiment, the confidential data 30 and the parity data 32 are stored in advance in memory. Specifically, as illustrated in FIG. 2, the confidential data segments (30-A to 30-C) and the segment parity data (32-A to 32-C) are alternately stored in a specific region in the memory for storing the confidential data 30, so as to achieve a pre-stored (recorded) state. Note that in FIG. 2 a case is shown in which the confidential data segments 30 are stored first, with alternate storage in sequence from the confidential data segment 30-A to the segment parity data 32-C. However the segment parity data may be stored first, with alternate storage in sequence from the segment parity data 32-A to the confidential data segment 30-C.

Figure 3:
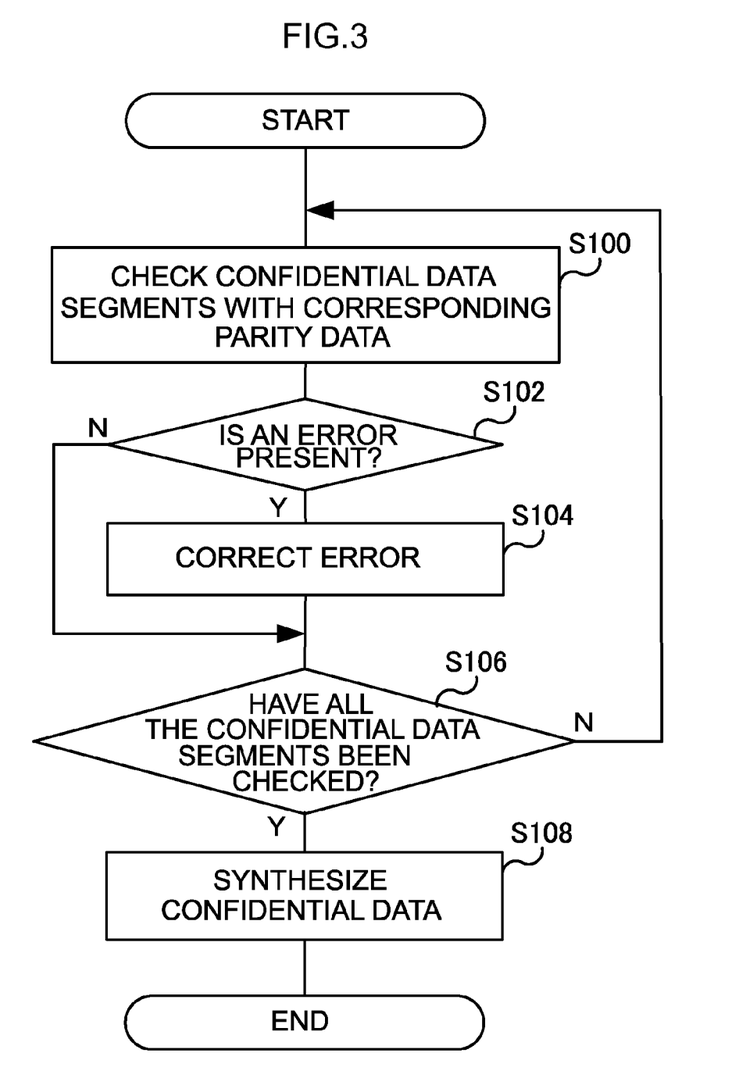
FIG. 3 is a flow chart illustrating an example of operation to read confidential data in the first exemplary embodiment.

Explanation next follows regarding a read operation of the confidential data 30 stored (recorded) in the memory of the semiconductor device 20 of the present exemplary embodiment. In the present exemplary embodiment, the confidential data segments (30-A to 30-C) stored in the memory are checked and corrected using the segment parity data (32-A to 32-C) and read, and operation (processing) to synthesize a single block of data is referred to as a "read operation" of the confidential data 30. FIG. 3 illustrates a flow chart of an example of a read operation of the confidential data 30 in the semiconductor device 20 of the present exemplary embodiment. The operation to read the confidential data 30 is executed on input of an instruction to read the confidential data 30 from outside of the semiconductor device 20.

In step S100, confidential data segments are checked using the corresponding segment parity data. In the present exemplary embodiment, specifically as described above, the confidential data segment 30-A is checked with the segment parity data 32-A. The confidential data segment 30-B is checked with the segment parity data 32-B, and the confidential data segment 30-C is checked with the segment parity data 32-C. In step S100 one of the confidential data segments stored (recorded) in the memory is checked with the corresponding segment parity data. The checking method may be similar to error checking in a general ECC memory, and details thereof are omitted.

At the next step S102, a check result, whether or not an error has occurred is determined. Processing proceeds to step S106 when no error has occurred. However processing proceeds to step S104 when an error has occurred, and then processing proceeds to step S106 after the error has been corrected using the corresponding segment parity data.

Determination is made at step S106 as to whether or not checking of all of the confidential data segments (30-A to 30-C) has been completed. Processing returns to step S100 when not complete, and the current processing is repeated. However, when complete the processing proceeds to step S108.

At step S108, the confidential data segments (30-A to 30-C) are read and synthesized as the confidential data 30, and then the current processing is ended. Note that the current synthesis processing includes cases realized by storing in sequence in a temporary storage memory with unique dedicated processing, and cases realized by the CPU 22 acquiring the confidential data segments (30-A to 30-C) and performing software processing. It is possible to employ continuous data processing when realized by software processing.

In the confidential data control system 10 such as that of the present exemplary embodiment, control is performed such that the divided confidential data 30 in the memory (the external memory 18 and/or the memory 28) is stored alternately with the respective confidential data segments (30-A to 30-C) and the corresponding segment parity data (32-A to 32-C). When reading the confidential data 30, checking with the segment parity data is performed for errors in the confidential data segments, and any errors occurring are corrected, so as to read and synthesize as the confidential data 30.

Since the confidential data 30 is not stored altogether in the memory, the confidential data 30 is rendered difficult to discern even in cases in which unauthorized access (hacking) of the confidential data control system 10 (the semiconductor device 20) has occurred. The confidential data 30 can accordingly be safeguarded. An advantageous effect of suppressing hacking is also obtained. Moreover, in the present exemplary embodiment, error correction of the confidential data 30 can also be performed due to employing the parity data 32 (the segment parity data (32-A to 32-C)) so as to make the confidential data 30 stored not homogenous and uninterrupted.

Second Exemplary Embodiment

The present exemplary embodiment, including configuration and operation, is substantially the same as that of the confidential data control system 10 and the semiconductor device 20 of the first exemplary embodiment. Substantially the same configuration and operation is indicated by allocation of the same reference numerals and detailed explanation thereof is omitted.

Figure 4:
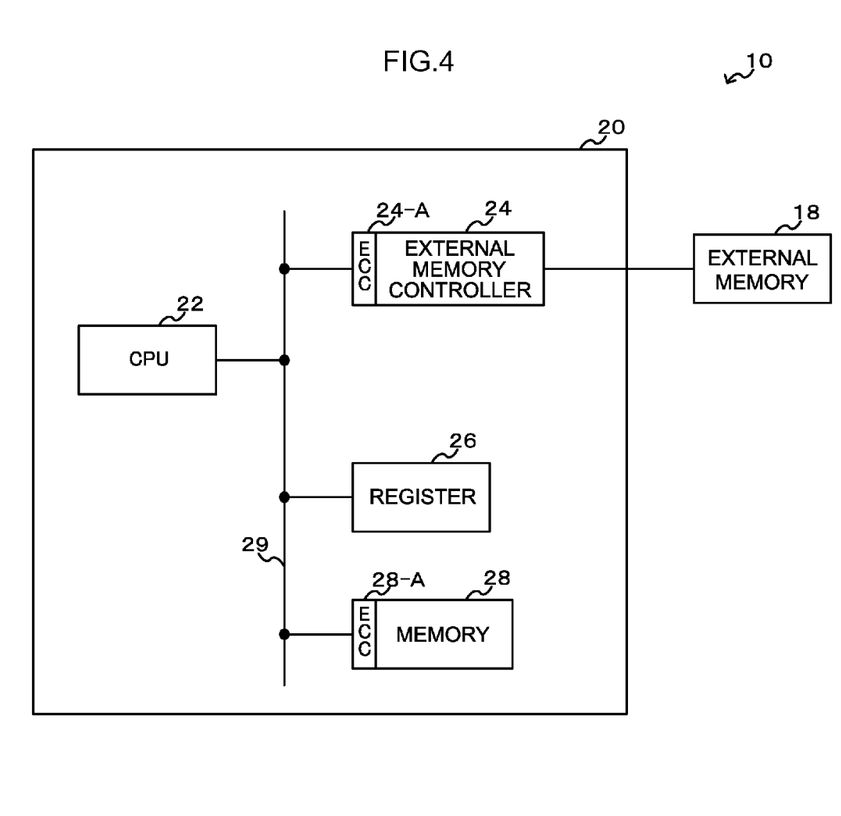
FIG. 4 is a circuit diagram illustrating an example of a schematic configuration of a confidential data control system and a semiconductor device for controlling confidential data in a second exemplary embodiment.

An example of a schematic configuration of a confidential data control system and a semiconductor device for controlling confidential data of the present exemplary embodiment is illustrated in FIG. 4. As illustrated in FIG. 4, a semiconductor device 20 of the present exemplary embodiment also includes an additional register to the configuration the semiconductor device 20 of the first exemplary embodiment (see FIG. 1).

The register 26 has a function to store in advance a storage position (such as a start address) and a capacity for each item of dummy data, described later. Note that instead of storing the capacity as it is, the start address and the end address may be stored for each item of dummy data.

Figure 5:
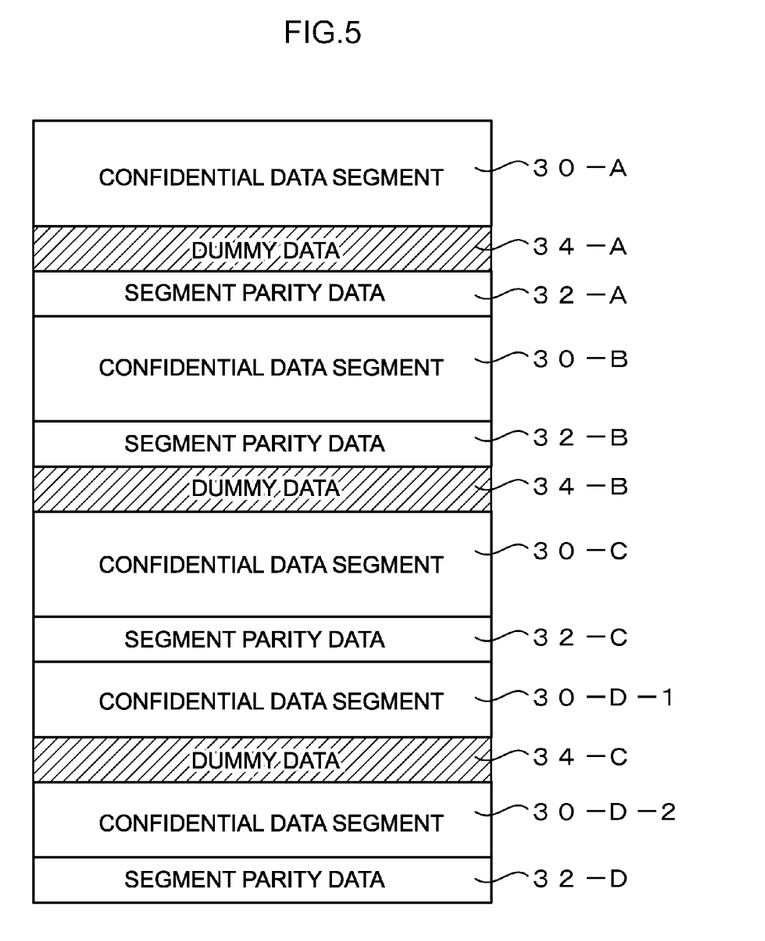
FIG. 5 is a schematic diagram for explaining confidential data and parity data stored in a memory and/or an external memory in the second exemplary embodiment.

FIG. 5 is a schematic diagram illustrating confidential data 30 and parity data 32 of the present exemplary embodiment that are stored in at least one of the external memory 18 and/or the memory 28 (referred to collectively as "memory", similarly to previously). In the present exemplary embodiment, plural items of dummy data 34 are also stored in addition to the confidential data 30 (confidential data segments (30-A to 30-C)) and the parity data 32 (segment parity data (32-A to 32-D)).

Note that in the present exemplary embodiment, "dummy data" refers to data unrelated to either the confidential data 30 or the parity data 32. Note that in order to render the confidential data 30 and the parity data 32 difficult to discern to unauthorized access, preferably data is employed that on first appearances is meaningful data but is actually unrelated to either the confidential data 30 or the parity data 32, rather than simple meaningless data (for example rows of numbers).

FIG. 5 illustrates a case in which the dummy data 34 (three items of dummy data 34-A to 34-C) are stored in an inserted state between the confidential data 30 that is divided into four (confidential data segments (30-A to 30-D)), and the alternately stored parity data 32 (the segment parity data (32-A to 32-D)) corresponds to the confidential data 30.

As illustrated in FIG. 5, each item of the dummy data 34 may be inserted after one of the confidential data segments and before one of the segment parity data, or may be inserted after one of the segment parity data and before one of the confidential data segments. The dummy data 34 may also be inserted into a single confidential data segment or into a single segment parity data.

Note that there is no particular limitation to the number of dummy data 34 items for insertion. A greater number thereof is preferable from the perspective of enhancing security. However, since the total capacity of data to be stored also increases as the number of the dummy data 34 increases, and the processing to read the confidential data 30 becomes more complicated, the number of the dummy data 34 may be determined in consideration of these factors. Each item of the dummy data 34 may be the same data as each other, or may be different data from each other. Note that different data is preferably employed in order to render the confidential data 30 and the parity data 32 difficult to discern to unauthorized access.

Figure 6:
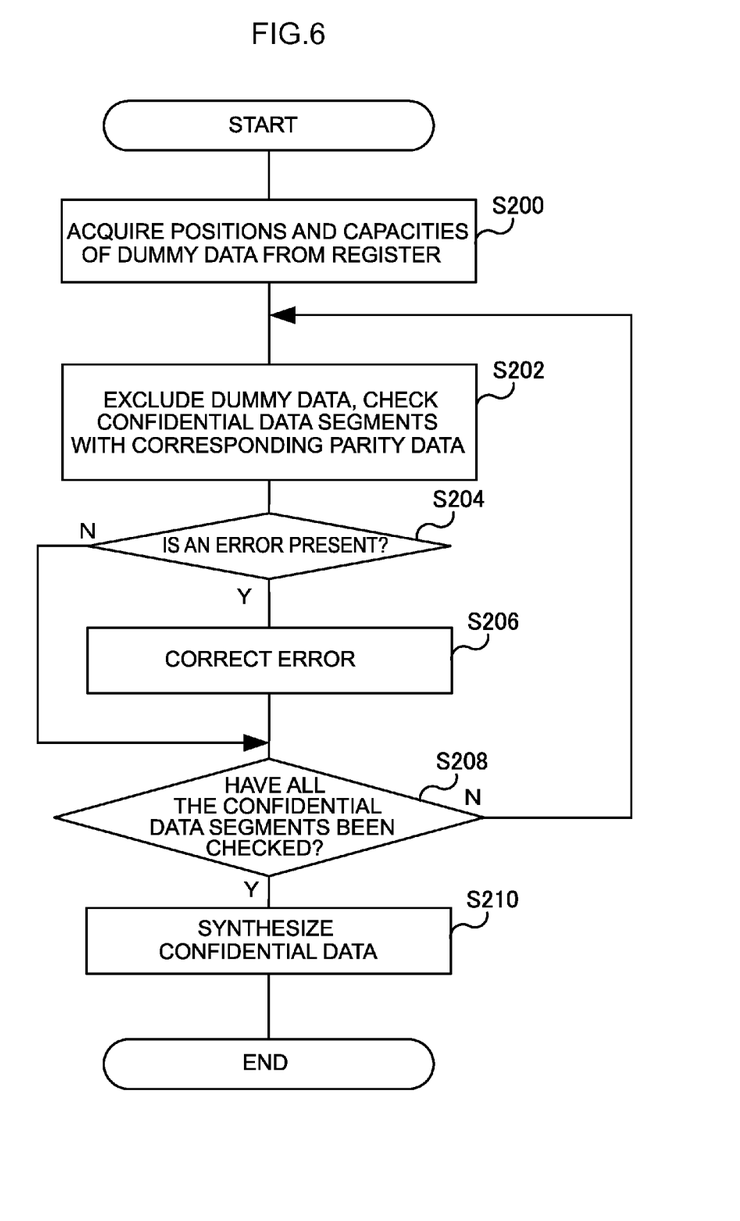
FIG. 6 is a flow chart illustrating an example of operation to read confidential data in the second exemplary embodiment.

Explanation next follows regarding read operation of the confidential data 30 stored (recorded) in memory in the semiconductor device 20 of the present exemplary embodiment. FIG. 6 illustrates a flow chart of an example of a read operation of the confidential data 30 in the semiconductor device 20 of the present exemplary embodiment. The operation to read the confidential data 30 is executed on input with an instruction to read the confidential data 30 from outside the semiconductor device 20.

First, at step S200, the positions and the capacities of the dummy data 34 (34-A to 34-C) are acquired from the register 26. Since the positions and the capacities of the dummy data 34 (34-A to 34-C) is accordingly known, the confidential data 30 (the confidential data segments (30-A to 30-D)) can then be read so as to exclude the dummy data 34.

The subsequent processing of step S202 to step S210 corresponds respectively to step S100 to step S108 of the confidential data read operation of the first exemplary embodiment (see FIG. 3). Processing is repeatedly performed to check the confidential data segments with the corresponding segment parity data, and to correct errors with the corresponding segment parity data when any errors have occurred. When checking of all of the confidential data segments (30-A to 30-D) is complete, the confidential data segments (30-A to 30-D) are synthesized so as to be read as the confidential data 30, and then the current processing is ended.

The confidential data control system 10 of the present exemplary embodiment accordingly controls to further insert the dummy data 34 when alternately storing each of the confidential data segments (30-A to 30-C) of the divided confidential data 30 and the corresponding segment parity data (32-A to 32-C) in the memory (the external memory 18 and/or the memory 28). When reading the confidential data 30, the dummy data 34 are excluded according to the positions and capacities of the dummy data 34 stored in the register 26, checking with the segment parity data is performed for errors in the confidential data segments, and any errors occurring are corrected, so as to read and synthesize as the confidential data 30.

In the present exemplary embodiment, the confidential data 30 is rendered more difficult to discern since control is performed to deliberately insert the otherwise unnecessary dummy data 34 and store the confidential data 30 in the memory. Consequently, the advantageous effects are exhibited of enabling the confidential data 30 to be even better safeguarded, and hacking to be suppressed.

Third Exemplary Embodiment

The present exemplary embodiment, including configuration and operation, is substantially the same as that of the confidential data control system 10 and the semiconductor device 20 of the first exemplary embodiment and the second exemplary embodiment. Substantially the same configuration and operation is indicated by allocation of the same reference numerals and detailed explanation thereof is omitted.

The schematic configuration of a confidential data control system and a semiconductor device for controlling confidential data of the present exemplary embodiment is substantially the same in configuration and operation to the second exemplary embodiment and so explanation thereof is omitted.

Figure 7:
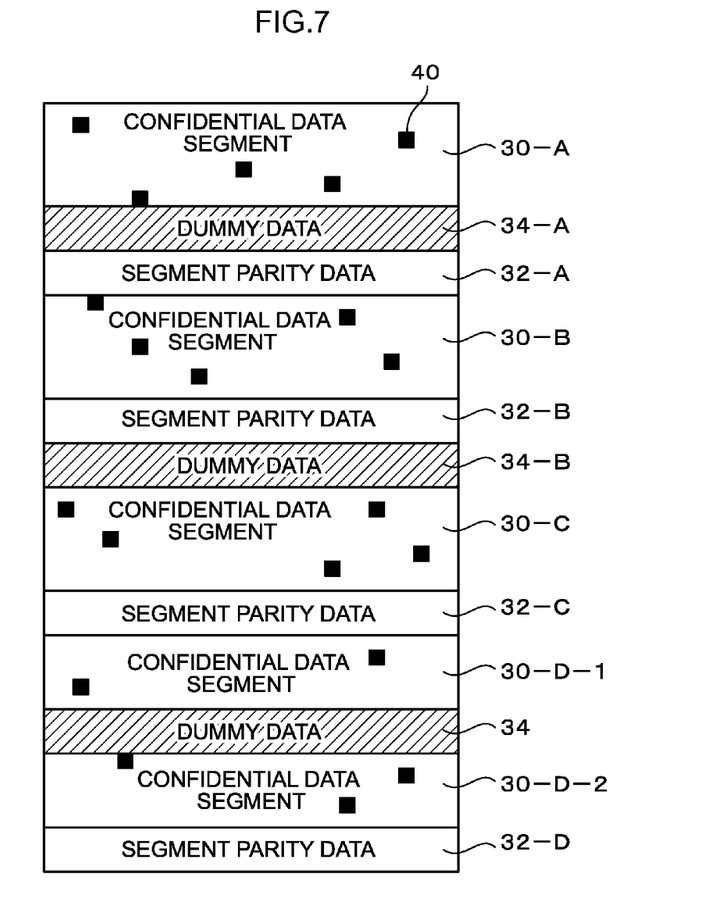
FIG. 7 is a schematic diagram for explaining confidential data and parity data stored in a memory and/or an external memory in a third exemplary embodiment.

FIG. 7 is a schematic diagram illustrating confidential data and parity data of the present exemplary embodiment stored in at least one of the external memory 18 and/or the memory 28 (collectively referred to below as "memory", similarly to previously). Substantially the same as with the confidential data and the parity data of the second exemplary embodiment (see FIG. 5), in the present exemplary embodiment control is performed such that the confidential data and the parity data are stored alternately in a state inserted with dummy data 34.

Moreover, in the present exemplary embodiment, part of each of confidential data segments (30-A to 30-D) is intentionally damaged to become error data 40. Note that the error data 40 is set so as not to exceed the number of bits correctable by each of the segment parity data (32-A to 32-D). There is moreover no particular limit to the number of the error data 40 for insertion as long as it is within a range correctable by each of the segment parity data (32-A to 32-D). A larger number is preferably employed from the perspective of enhancing security. However, processing to read the confidential data 30 becomes complicated as the number of the error data 40 increases, and so the number is preferably determined in consideration thereof.

Moreover, in the present exemplary embodiment, the error data 40 is inserted into all of the confidential data segments (30-A to 30-D), however there is no limitation thereto, and the error data 40 may be inserted into only some of the confidential data segments (30-A to 30-D). Note that from the perspective of enhancing security the error data 40 is preferably inserted into all of the confidential data segments (30-A to 30-D) as in the present exemplary embodiment.

In the semiconductor device 20 of the present exemplary embodiment, the operation to read the confidential data 30 stored (recorded) in the memory is similar to that of the second exemplary embodiment (see FIG. 6). Note that in the present exemplary embodiment, when the confidential data segments have been checked with the parity data at step S202, determination at the next step S204 is that errors are present due to the error data 40 being inserted, and processing proceeds to step S206. At step S206, the error data 40 is corrected with the parity data 32 (the segment parity data (32-A to 32-D)).

The confidential data control system 10 of the present exemplary embodiment accordingly controls to damage part of the confidential data as error data 40, within a range correctable by the parity data, when alternately storing each of the confidential data segments (30-A to 30-D) of the divided confidential data 30 and the corresponding segment parity data (32-A to 32-D) in the memory (the external memory 18 and/or the memory 28). When reading the confidential data 30, the error data 40 are corrected by the segment parity data (32-A to 32-D), enabling the confidential data 30 to be read as normal data.

In the present exemplary embodiment, the error correction function of the parity data 32 is employed effectively such that control stores the confidential data 30 in the memory in a state in which part of the confidential data 30 has been deliberately damaged. Thus normal (correct) data values are rendered more difficult to discern even when data in the memory is read improperly due to unauthorized access (hacking). The advantageous effects are accordingly obtained of enabling the confidential data 30 to be even better safeguarded, and hacking to be suppressed.

Note that although in the present exemplary embodiment explanation has been given of a case in which the confidential data 30 is controlled in a state inserted with the dummy data 34 (as in a case of the second exemplary embodiment) there is no limitation thereto, and application may be made to cases in which the confidential data 30 is controlled without the dummy data 34 being inserted (as in a case of the first exemplary embodiment).

Note that whereas in each of the present exemplary embodiments explanation has been given of case in which the external memory controller 24 and the memory 28 each include an ECC function, there is no limitation thereto. A functional section may be provided separately to an external memory controller and memory (internal memory) to perform checking and correction of confidential data based on parity data. Such checking and correction may also be performed in a circuit, or performed using software.

Although explanation has been given in each of the exemplary embodiments above of cases in which the confidential data and the parity data are stored in advance in the memory (the external memory 18 and the memory 28), the storage method to the memory is not limited thereto. Software processing may be applied by the CPU 22 so as to store in the memory.

Moreover, such details as the sequence and capacity of the confidential data segments, the segment parity data, and also the dummy data 34 stored in the memory is also not limited to those of each of the above exemplary embodiments. Note that, for example in cases in which the sequence is changed at random, data indicating the respective storage positions and capacities are preferably stored, such as in the register 26.

The register 26 is employed in the second exemplary embodiment and the third exemplary embodiment above, however there is no limitation thereto, and a memory may be employed. Note that a register is preferably employed from the perspective of simplicity.

Moreover, such features as the configurations and operations of the confidential data control system 10, the semiconductor device 20, the external memory 18 and the memory 28 explained in the above exemplary embodiments are merely examples thereof, and obviously various modifications are possible according to the circumstances within a range not departing from the spirit of the present invention.

According to the present invention, the advantageous effect is exhibited of enabling confidential data to be safeguarded even if unauthorized access occurs.

What is claimed is:

1. A semiconductor device comprising:
   a correction unit that corrects an error in a plurality of confidential data segments based on a plurality of segment correction data, wherein a single item of confidential data is divided into a plurality of confidential data segments and wherein a plurality of segment correction data for correcting errors in the plurality of confidential data segments and the plurality of confidential data segments are alternately stored on a storage unit; and a synthesis unit that synthesizes the plurality of confidential data segments output from the correction unit.

2. The semiconductor device of claim 1 wherein:

the plurality of confidential data segments are data from dividing the confidential data into a plurality according to a specific unit amount of data used by the correction unit for performing checking and correction;

each of the plurality of segment correction data is correction data corresponding to the confidential data segment of the specific unit amount.

3. The semiconductor device of claim 1 wherein:

at least one item of dummy data is stored in the storage unit between the plurality of confidential data segments and the plurality of segment correction data; and the synthesis unit synthesizes the plurality of confidential data segments that have been read by avoiding reading of the dummy data.

4. The semiconductor device of claim 3 wherein:

the semiconductor device further comprises a dummy data information storage unit that stores a position and a capacity of the dummy data stored in the storage unit; and the synthesis unit reads the plurality of confidential data segments that have been read by avoiding reading the dummy data based on the position and the capacity of the dummy data stored in the dummy data information storage unit.

5. The semiconductor device of claim 1 wherein the confidential data segments include error data that has been damaged to an extent correctable with the segment correction data.

6. The semiconductor device of claim 1 wherein the storage unit is provided internally to the device itself.

7. A confidential data control system comprising:

a semiconductor device that includes:
   a correction unit that corrects an error in a plurality of confidential data segments based on a plurality of segment correction data, wherein a single item of confidential data is divided into a plurality of confidential data segments and wherein a plurality of segment correction data for correcting errors in the plurality of confidential data segments and the plurality of confidential data segments are alternately stored on a storage unit and
   a synthesis unit that synthesizes the plurality of confidential data segments output from the correction unit; and a storage unit provided externally to the semiconductor device and storing alternately a plurality of confidential data segments and a plurality of segment correction data for correcting errors in the plurality of confidential data segments.

8. The confidential data control system of claim 7, wherein:

the plurality of confidential data segments are data from dividing the confidential data into a plurality according to a specific unit amount of data used by the correction unit for performing checking and correction; and each of the plurality of segment correction data is correction data corresponding to the confidential data segment of the specific unit amount.

9. The confidential data control system of claim 7, wherein:

at least one item of dummy data is stored in the storage unit between the plurality of confidential data segments and the plurality of segment correction data; and the synthesis unit synthesizes the plurality of confidential data segments that have been read by avoiding reading of the dummy data.

10. The confidential data control system of claim 9, wherein:

the semiconductor device further comprises a dummy data information storage unit that stores a position and a capacity of the dummy data stored in the storage unit; and the synthesis unit reads the plurality of confidential data segments that have been read by avoiding reading the dummy data based on the position and the capacity of the dummy data stored in the dummy data information storage unit.

11. The confidential data control system of claim 7, wherein:

the confidential data segments include error data that has been damaged to an extent correctable with the segment correction data.

12. A confidential data control method employed when reading confidential data stored in a state divided into a plurality of confidential data segments from a storage unit storing alternately a plurality of confidential data segments and a plurality of segment correction data for correcting errors in the plurality of confidential data segments, the control method comprising:

reading, by a processor, corrected confidential data segments that have been checked for the presence or absence of errors in the confidential data segments based on the segment correction data and have been corrected when an error has occurred; and synthesizing, by the processor, the confidential data from the plurality of confidential data segments.

* * * * *